United States Patent
Henaire et al.

(10) Patent No.: US 10,681,105 B2
(45) Date of Patent: Jun. 9, 2020

(54) DECISION ENGINE FOR DYNAMICALLY SELECTING MEDIA STREAMS

(71) Applicant: Facebook, Inc., Menlo Park, CA (US)

(72) Inventors: Mathieu R. Henaire, Redmond, WA (US); Amit Puntambekar, Fremont, CA (US); Minchuan Chen, Redmond, WA (US)

(73) Assignee: Facebook, Inc., Menlo Park, CA (US)

( * ) Notice: Subject to any disclaimer, the term of this patent is extended or adjusted under 35 U.S.C. 154(b) by 131 days.

(21) Appl. No.: 15/396,064

(22) Filed: Dec. 30, 2016

(65) Prior Publication Data

US 2018/0191800 A1 Jul. 5, 2018

(51) Int. Cl.
*G06F 15/16* (2006.01)
*H04L 29/06* (2006.01)
*H04L 29/08* (2006.01)

(52) U.S. Cl.
CPC ........ *H04L 65/607* (2013.01); *H04L 65/4076* (2013.01); *H04L 65/4084* (2013.01);
(Continued)

(58) Field of Classification Search
CPC ............... H04N 19/91; H04N 21/2187; H04N 21/2383; H04N 21/2387; H04N 21/26216; H04N 21/47202; H04N 21/64792; H04N 21/6582; H04N 7/15; H04L 65/4084; H04L 67/02; H04L 67/2823; H04L 65/4076; H04L 65/605; H04L 65/607; H04L 67/06; H04L 67/303; H04L 67/42; H04L 65/403
(Continued)

(56) References Cited

U.S. PATENT DOCUMENTS 6,374,359 B1  4/2002  Shrader et al.
7,243,079 B1  7/2007  Manolis et al.
(Continued)

OTHER PUBLICATIONS

PCT International Search Report and Written Opinion, PCT Application No. PCT/US2010/038856, dated Aug. 17, 2010, eight pages.
(Continued)

*Primary Examiner* — Dustin Nguyen
*Assistant Examiner* — Hao H Nguyen
(74) *Attorney, Agent, or Firm* — Fenwick & West LLP

(57) ABSTRACT

An online system receives content (e.g. video content and/or audio content) from a content provider device to be appropriately transcoded and distributed to client devices for consumption. During the transcoding process, the online system decodes the content into an intermediate format, and. considers a variety of characteristics to decide the optimal set of content encodings for encoding the decoded content. Characteristics include source characteristics associated with the content provider device, social graph characteristics of the user of the online system that is using the content provider device, viewer characteristics associated with the client devices that request to access the content, and content characteristics. The online system encodes the content for each client device with appropriate encoders selected based on the optimal set of content encodings. For each client device that requests to access the content, the online system provides encoded content that the client device can appropriately playback.

16 Claims, 5 Drawing Sheets

(52) U.S. Cl.
CPC ............ *H04L 65/605* (2013.01); *H04L 67/02* (2013.01); *H04L 67/06* (2013.01); *H04L 67/42* (2013.01)

(58) Field of Classification Search
USPC ............... 709/203, 204, 219, 230, 231, 246; 386/201, 241, 278; 348/14.08, 14.09, 348/14.12, 14.13
See application file for complete search history.

(56) References Cited

U.S. PATENT DOCUMENTS

| | | | |
|---|---|---|---|
| 8,291,452 | B1 | 10/2012 | Yong et al. |
| 2003/0046365 | A1 | 3/2003 | Pfister et al. |
| 2007/0039050 | A1 | 2/2007 | Aksenov et al. |
| 2007/0083527 | A1 | 4/2007 | Wadler et al. |
| 2007/0189708 | A1 | 8/2007 | Lerman et al. |
| 2008/0147671 | A1 | 6/2008 | Simon et al. |
| 2009/0031384 | A1* | 1/2009 | Brooks ............ H04N 21/23439 725/127 |
| 2009/0177761 | A1 | 7/2009 | Meyer et al. |
| 2009/0222925 | A1 | 9/2009 | Hilaiel et al. |
| 2010/0195977 | A1 | 8/2010 | Bennett et al. |
| 2010/0321469 | A1* | 12/2010 | Jeong .................... H04N 7/147 348/14.09 |
| 2012/0054809 | A1 | 3/2012 | Chowdhury et al. |
| 2012/0078997 | A1* | 3/2012 | Evans .................... G06Q 10/00 709/203 |
| 2012/0079126 | A1* | 3/2012 | Evans ................ H04L 67/1095 709/230 |
| 2012/0131146 | A1* | 5/2012 | Choi .................... H04L 65/4069 709/219 |
| 2012/0246677 | A1 | 9/2012 | Fasting |
| 2013/0173819 | A1* | 7/2013 | Lee .................. H04N 21/23418 709/231 |
| 2014/0032658 | A1* | 1/2014 | Falls .............. H04N 21/234309 709/204 |
| 2014/0098850 | A1* | 4/2014 | Wolfram .......... H04N 21/23439 375/240.02 |
| 2014/0165116 | A1 | 6/2014 | Major et al. |
| 2014/0274358 | A1* | 9/2014 | Hoskins .................. A63F 13/25 463/29 |
| 2014/0376609 | A1* | 12/2014 | Barkley ................. H04N 7/147 375/240.02 |
| 2015/0024839 | A1* | 1/2015 | Zahn .................. H04N 21/4781 463/31 |
| 2015/0199996 | A1* | 7/2015 | Krishnamurthy .. G11B 27/3081 386/241 |
| 2015/0222815 | A1* | 8/2015 | Wang .................... G11B 27/031 348/36 |
| 2016/0150184 | A1* | 5/2016 | Gandhi .................. H04N 7/147 348/14.08 |
| 2016/0173736 | A1 | 6/2016 | Kniazev et al. |

OTHER PUBLICATIONS

United States Office Action, U.S. Appl. No. 16/293,342, dated Nov. 27, 2019, nine pages.
United States Office Action, U.S. Appl. No. 16/264,474, dated Mar. 18, 2020, 29 pages.

* cited by examiner

DECISION ENGINE FOR DYNAMICALLY SELECTING MEDIA STREAMS

BACKGROUND

This disclosure generally relates to distributing digital content, and more specifically to utilizing a decision engine for dynamically determining the content encodings for delivering appropriately encoded media content to a client device.

The advent of online systems has enabled users of the online system to be able to conveniently share content. Thus, online systems receive overwhelming amounts of content that must be appropriately processed (e.g., transcoding source content into output content in an appropriate format) before being delivered to client devices. A challenging step in the transcoding process includes encoding the content such that a client device that receives the encoded content can readily playback the content for a user.

Online systems often generate a wide set of content encodings for a particular piece of digital content, e.g., a source media stream, to ensure that each client device that requests to access the content can receive content that has been appropriately encoded for that client device. However, in an effort to ensure that the appropriate content encodings are available without knowing characteristics of receiving devices or network conditions during the distribution beforehand, an online system may generate various content encodings that are not distributed or limitedly distributed to client devices. Given that encoding content is a highly computationally expensive process, encoding content that will not be distributed or only limitedly distributed is a waste of the online system's resources. As an example, currently, very few client devices can currently display content with an 8K video resolution. Therefore, if the online system encodes a video content with an 8K video resolution, it risks wasting the resources that were used to generate that encoding because the probability of a client device that can playback a video with 8K video resolution may be low.

SUMMARY

Embodiments of an online system provide a solution that enables the online system to dynamically identify the content encodings for received content. The online system serves as a platform that receives, processes, and appropriately distributes digital content to viewers. Here, the content may be live (e.g. a live broadcasting stream provided by a content provider device) or non-live (e.g. previously stored video, or video-on-demand). More specifically, the online system receives the content that includes video and audio data and decodes the content to generate decoded video and audio data. The appropriate decoders are utilized by the online system because each content may have been undergone a different encoding process when it was generated by its respective source.

Prior to distributing the content, the online system generates a set of content encodings of the video and audio information. Given that encoding video and audio content is an expensive computing process, the online system identifies an optimal set of content encodings. Therefore, the online system can avoid generate content encodings that are likely to be underutilized or wasted. The online system can employ a decision engine that obtains a variety of characteristics that can be factored into dynamically deciding the optimal set of content encodings. These characteristics can be associated with the device that provides the content, associated with the devices that are requesting to access the content, associated with the user of the online system that provided the content to the online system, or associated with the content itself.

The online system employs a variety of techniques in order to consider the characteristics in determining the optimal set of content encodings that would minimize wasted resources while also ensuring that all client devices that request the content can be provided an appropriately encoded content. For example, the online system can filter out content encodings that would be incompatible. If the content was generated using a low video resolution (e.g. 480p), then the online system filters out content encodings that are configured for higher video resolution (e.g. 720p, 1080p, 4K). As another example, the online system can directly map the characteristics to a set of content encodings. For example, if the user of the online system that provided the content is highly popular and often receives numerous comments regarding previously provided content, the online system can automatically select a large set of optimal content encodings. A third technique includes applying the characteristics to a machine learning model. The machine learning model weighs each of the characteristics in determining the optimal set of content encodings.

The online system generates each of the content encodings that are determined to be in the optimal set of content encodings. When the online system receives a request to access the content, the online system determines which content encoding is best suited for the client device that sent the request. For example, if the client device is located in a geographical location with poor network connectivity, the online system can choose to distribute a content encoding with a smaller file size to minimize latency and buffering issues that would typically significantly detract from the viewing experience.

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION

Overview of System Environment

Figure 1:
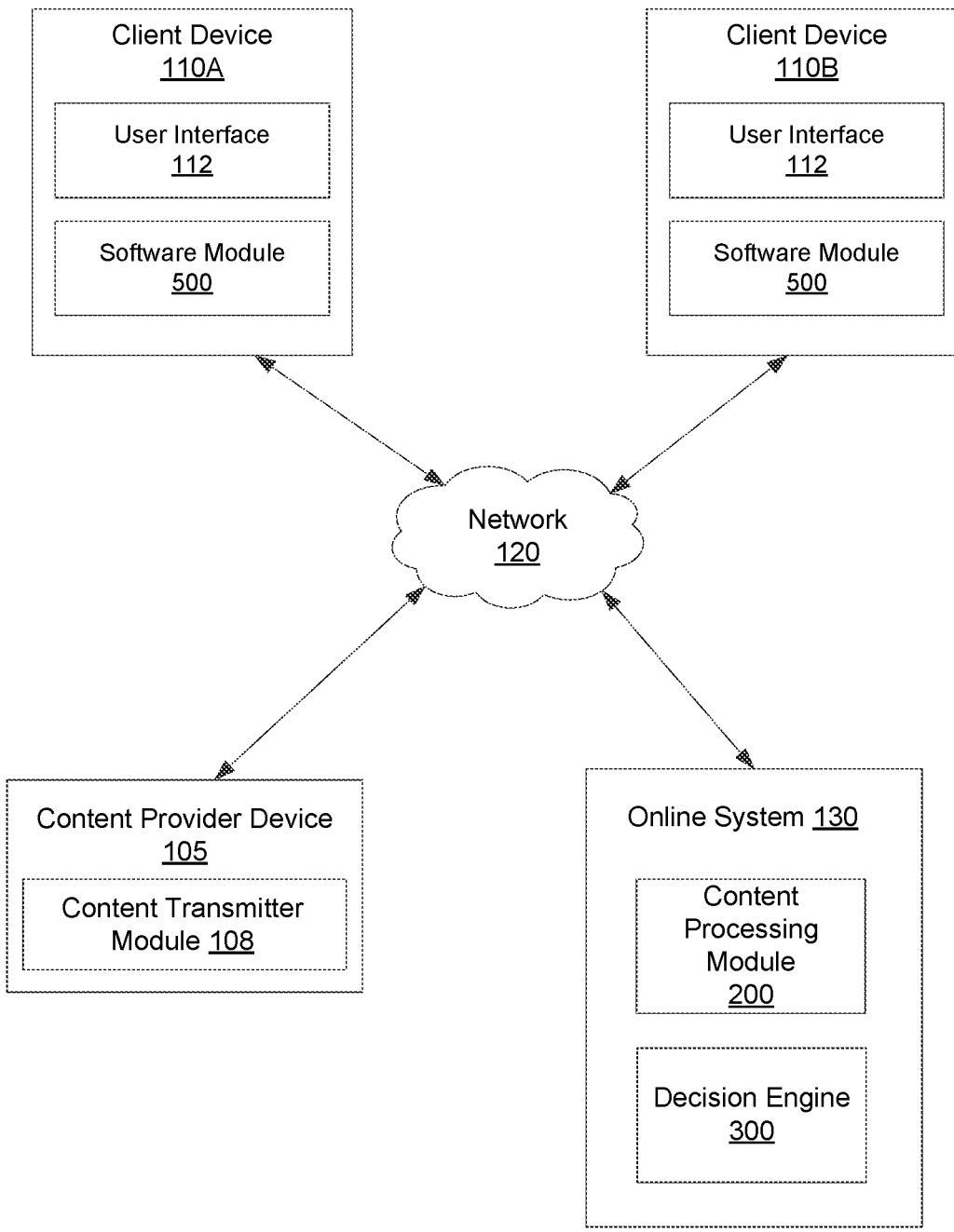
FIG. 1 illustrates a system environment including an online system with a decision engine, in accordance with an embodiment.

FIG. 1 illustrates a system environment 100 for presenting content to users of an online system, in accordance with an embodiment. The system environment 100 includes a content provider device 105, one or more client devices 110, and an online system 130 including a content processing module 200 and a decision engine 300, each of which are interconnected through the network 120. Although the system environment 100 depicts two client devices 110A and 110B and one content provider device 105, one can envision that there may be any number of client devices 110 and content provider devices 105.

FIG. 1 and the other figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "110" in the text refers to reference numerals "110A" and/or "110B" in the figures).

Each content provider device 105 provides content to the online system 130 through the network 120. Each content provider device 105 includes a content transmitter module 108 for transmitting and/or generating the content. As one example, the content provider device 105 can provide live content to the online system 130. Therefore, the content transmitter module 108 can include a processor coupled to an optical device (e.g. camera) that records video and audio data of the content. As another example, the content provider device 105 provides non-live content. Therefore, the content transmitter module 108 retrieves the content from a memory storage. As used hereafter, live content refers to content that is intended to be consumed by a viewer of a client device 110 in real-time (e.g. simultaneously) while the live content is generated by the content provider device 105. Thus, the online system 130 needs to immediately process and transmit the live content to client devices 110 when the live content is received from a content provider device 105. Non-live content refers to content that need not be immediately transmitted by the online system 130 to a client device 110.

Regarding both live and non-live content, the content transmitter module 108 encodes the content into one or more content encodings. The content transmitter module 108 encodes the content according to configurations of the content provider device 105. In various embodiments, the content transmitter module 108 separately encodes the video and the audio components/data of the content. For example, in regards to the video, the content provider device 105 may be instructed to generate a video with a particular setting (e.g. video resolution, frame rate) which triggers the content transmitter module 108 to select an appropriate encoder to encode the video based on the selected setting. As an example, the content transmitter module 108 can encode the video portion of the content using a first encoder (e.g. H.264) and the audio portion of the content using a second encoder (e.g. advanced audio coding, AAC).

Regarding the audio content, the content transmitter module 108 may be instructed to generate audio data with a particular audio setting (e.g. bit rate, mono/stereo sound). Thus, the content transmitter module 108 encodes the audio based on the selected audio setting. For example, the content transmitter module 108 may, by default, select AAC as the audio encoder. In various embodiments, if the user selects a high bit rate and wants to maintain the quality of the audio in the stream, the content transmitter module 108 can select audio interchange file format (AIFF) or other encoders (e.g. lossless encoders) that ensures the high quality of the audio stream.

After encoding the video and audio of the content, the content provider device 105 sends the content through the network 120 to the online system 130 to be transmitted to one or more client devices 110. In various embodiments, the content provider device 105 includes generated metadata information associated with the content that includes the encoders that were used to encode the video and audio. In other embodiments, the content provider device 105 also sends characteristics of the content provider device 105 (e.g. device identifier, camera specifications) to aid the online system 130 in the process of transmitting the stream to one or more client devices 110.

In addition to transmitting the content to the online system 130, the content provider device 105 may also transmit information regarding intrinsic characteristics of the content provider device 105. For example, the content provider device 105 may be a laptop that includes a camera with a pre-configured resolution (e.g. megapixels) and a microphone with a pre-configured recording bitrate. Therefore, the intrinsic characteristics sent to the online system 130 include the camera resolution and/or recording bitrate. In another example, the content provider device 105 may be a mobile cell phone. Therefore, the intrinsic characteristics sent to the online system 130 can include, in addition to camera/microphone characteristics, the operating platform (e.g. iOS™, Android™, Windows™ Phone) that the mobile device is running.

In various embodiments, the content provider device 105 belongs to an individual that is a registered user of the online system 130. In other words, the individual may have a user profile stored on the online system 130 that identifies the user of the online system. When the user provides the content to the online system 130 using the content provider device 105, the user's profile information may be associated with the provided content. Therefore, the online system 130 can readily identify the user as having provided the content.

The online system 130 receives the content from the content provider device 105, transcodes the content, and distributes the content to client devices 110 so that the client device 110 can play back the content. To transcode the content, the online system 130 first decodes the content to generate decoded audio and video data of the content in an intermediate format, e.g., pulse-code modulation (PCM) for audio data and YUV for video data. The online system 130 then dynamically selects set of optimal encodings for encoding the content such that the encoded content can optimally serve a wide variety of viewers with a wide variety of client devices and network conditions.

In various embodiments, the online system 130 includes a content processing module 200 that is able to appropriately receive and decode the content based on the type of content that is received. For example, the content processing module 200 is configured to handle live content differently than non-live content. The content processing module 200 will be further discussed below in regards to FIG. 2.

Additionally, the online system 130 includes a decision engine 300 that identifies the optimal set of content encodings for encoding the content. For example, the decision engine 300 may decide that the video content and audio content each need a wide set of content encodings (e.g. different video/audio formats, different video resolutions, and different audio bitrates) because the user of the content provider device 105 is very popular and content provided by the content provider device 105 will likely be accessed by a wide variety of client devices 110. In another example, the decision engine 300 may decide that the video and audio of the content item only needs a limited set of encodings because the user of the content provider device 105 typically only has a limited number of viewers. Depending on whether the content received by the online system 130 is live or non-live content, the decision engine 300 can apply different sets of characteristics to determine the optimal set of content encodings for the live or non-live content. Further discussion regarding the identification of optimal encodings is described below in regards to FIG. 3.

The decision engine 300 additionally selects the appropriate encoders and encodes the content (e.g. video and audio) using the selected encoders to generate the set of optimal content encodings. For each client device 110 that requests for the content, the decision engine 300 determines the content encoding that would be best for that client device 110. For example, the decision engine 500 can identify certain characteristics (e.g. resolution of the screen, operating system, etc.) of the client device 110 that sent the request, and selects the content encoding that can be most effectively played back by the client device 110.

In various embodiments, the individuals that use the content provider device 105 and the client devices 110 are registered users of the online system 130. The online system 130 stores the registered users as nodes in a social graph maintained by the online system 130. A first user and a second user that are connected (e.g. friends) on the online system 130 have a stored edge that connects the nodes that represent the first and second users in the social graph. Nodes can further include objects of the social networking system, such as web pages embodying concepts and entities and edges may represent a connection between any two nodes.

A client device 110 is a computing device capable of receiving the encoded content from the online system 130 through the network 120 and playing back the encoded content for a viewer of the client device 110. Examples of client devices 110 include desktop computers, laptop computers, tablet computers (pads), mobile phones, personal digital assistants (PDAs), gaming devices, or any other electronic device including computing functionality and data communication capabilities. In various embodiments, a client device 110 also includes a user interface 112 that is configured to receive user inputs from a user of the client device 110. For example, the user interface 112 may be a touchscreen that the user of the client device 110 can use to login to the online system 130 and access his/her user profile that is stored on the online system 130. In another example, a user can use the user interface 112 of the client device 110 to send a request to the online system 130 for an encoded content item. In various embodiments, the client device 110 includes a software module 500 that is responsible for playing back the transmitted content. For example, the software module 500 appropriately decodes the video and audio components of the encoded content and plays the decoded video/audio on the user interface 112 of the client device 110.

The network 120 facilitates communications among one or more client devices 110, the online system 130. The network 10 may be any wired or wireless local area network (LAN) and/or wide area network (WAN), such as an intranet, an extranet, or the Internet. In various embodiments, the network 120 uses standard communication technologies and/or protocols. Examples of technologies used by the network 120 include Ethernet, 802.11, 3G, 4G, 802.16, or any other suitable communication technology. The network 120 may use wireless, wired, or a combination of wireless and wired communication technologies. Examples of protocols used by the network 120 include transmission control protocol/Internet protocol (TCP/IP), hypertext transport protocol (HTTP), simple mail transfer protocol (SMTP), file transfer protocol (TCP), or any other suitable communication protocol.

Processing Video and Audio Content

Figure 2:
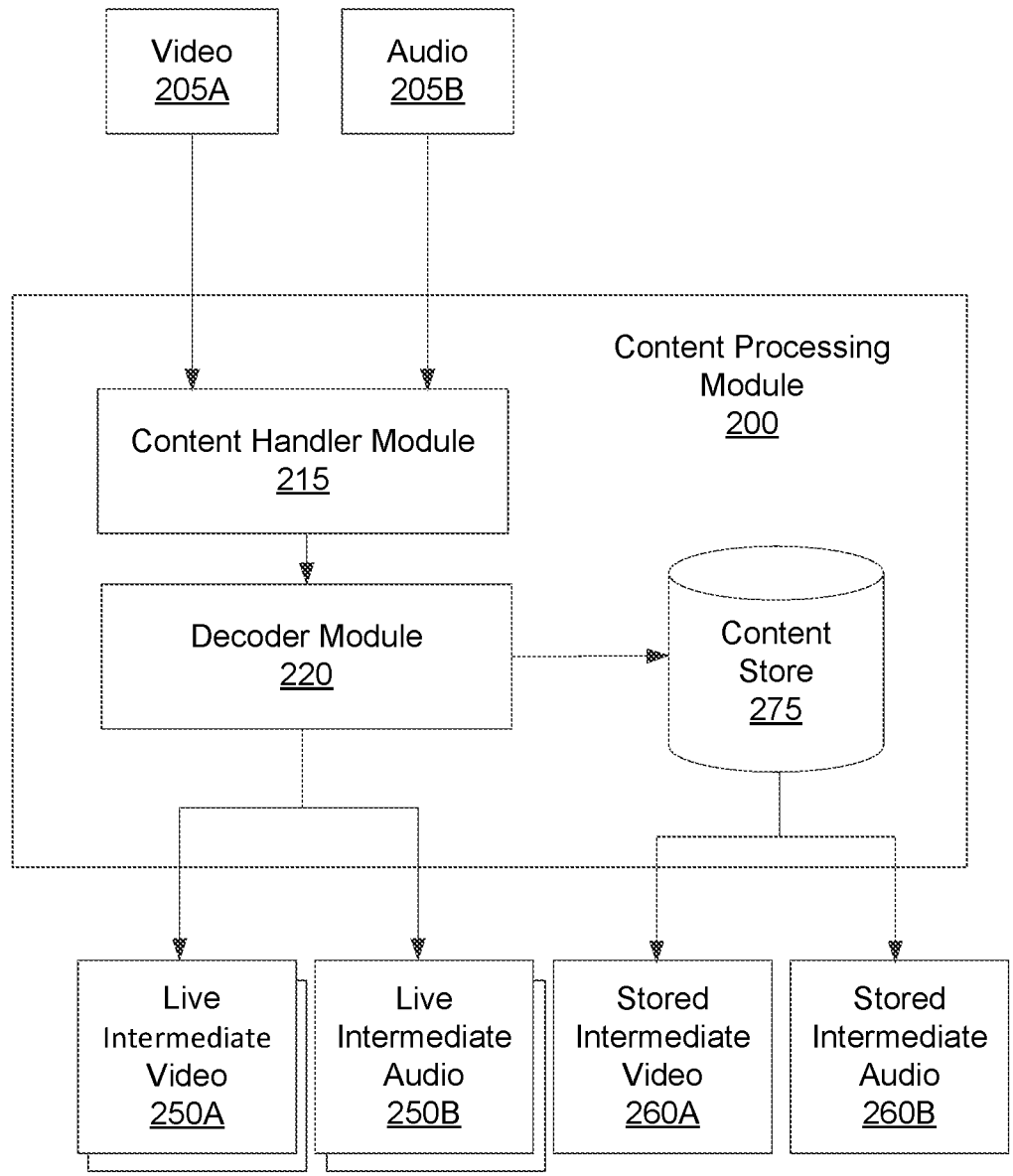
FIG. 2 illustrates a flow diagram for the content processing module of the online system, in accordance with an embodiment.

FIG. 2 illustrates a flow diagram for the content processing module 200 of the online system 130, in accordance with an embodiment. The content processing module 200 processes and decodes the content received by the online system 130. For example, if the content is live content that is to be transmitted to viewers in real time, e.g., live broadcasting, the content processing module 200 decodes the live content and passes the decoded live content along to the decision engine 300 for further processing. In another embodiment, the content processing module 200 receives the data packets of audio and video data according to the corresponding network protocols and transmits the data packets without decoding the content to the decision engine 300, which distributes the received data packets to receiving client devices without re-encoding the content. If the content is non-live content, the content processing module 200 decodes and stores the non-live content until the non-live content is required at a later time point. In various embodiments, the content processing module 200 includes a content handler module 215 and a decoder module 220 for receiving and decoding the content, respectively.

The content handler module 215 receives the content that originates from a content provider device 105. The content may include a video 205A component (e.g., video frames) as well as an audio 205B component (e.g. audio frames). As previously described, each video 205A and audio 205B component may be previously encoded (e.g. by the content provider device 105) according to settings or configurations associated with the content provider device 105. If the content is live content, the content handler module 215 may receive more than one video 205A and more than one audio 205B over the course of the live stream. For example, each video 205A and each audio 205B corresponds to a received data packet send from the content provider device 105 while the live stream is ongoing.

The content handler module 215 processes the video 205A and audio 205B information according to designated multimedia network protocols depending on whether the video 205A and audio 205B information is from live content or non-live content. For example, given that live content needs to be transmitted immediately to client devices 110, the designated protocol that the content handler module 215 uses may be a real time transport protocol (RTP) over universal datagram protocol (UDP). When using UDP, the content handler module 215 may be configured to receive the data packets corresponding to the video and audio of each media stream. In various embodiments, the data packets may be identifiably tagged (e.g., each data packet having a packet number in a sequence of data packets) such that the content handler module 215 may re-sequence the data packets if they are received out of order. In other embodiments, the content handler module 215 may skip over data packets that are lost while in transmission from the content provider device 105. Conversely, if the video 205A and audio 205B information is from non-live content, the content handler module 215 may process the video 205A and audio 205B components using a real-time messaging protocol (RTMP) over transmission control protocol (TCP). Thus, the content handler module 215 ensures that no data packets of the video 205A or audio 205B are lost in transmission. After receiving the respective video 205A and audio 205B data of the live or non-live content, the content handler module 215 sends them to the decoder module 220 for decoding.

The decoder module 220 receives and decodes the video 205A and audio 205B data of the content into files with an intermediate format, e.g., uncompressed/decoded audio data in PCM format and uncompressed/decoded video data in YUV format. To appropriately do so, the decoder module 220 may receive information associated with each video 205A and audio 205B file that specifies the encoder that was previously used to encode each file. For example, the encoder information may have been included in the RTP or RTMP header. For example, a content provider device 105 may have previously encoded a video using a H.264 encoder and an associated audio file using AAC encoding. Therefore, the metadata information specifies these encoders such that the decoder module 220 may retrieve the H.264 and AAC decoder to appropriately decode the video and audio files, respectively, to an intermediate format.

The decoder module 220 decodes the video 205A and audio 205B into a decoded format. If needed, the decoder module 220 can further alter or edit the decoded video and audio. This may be necessary because the video 205A and audio 205B originate from a variety of content provider devices 105 and therefore, need to be decoded and altered to fit the standards of the online system 130. For example, the decoder module 220 may crop the decoded video or change the audio bitrate of the decoded audio.

If the video 205A and audio 205B is live content, the decoder module 220 outputs a live intermediate video 250A and a live intermediate audio 250B. The live intermediate video 250A and live intermediate audio 250B can be passed to the decision engine 300 for encoding before being transmitted to client devices 110 for consumption. In various embodiments, each live intermediate video 250A and each live intermediate audio 250B is a data packet that corresponds to a portion of the live stream. Therefore, over the course of the live stream, the decoder module 220 repeatedly decodes video 205A and audio 205B packets until the live stream concludes. Alternatively, if the video 205A and audio 205B was non-live content, the decoder module 220 can choose to store the decoded video and audio data in the content store 275. Thus, at a subsequent time point, the stored intermediate video 260A and the stored intermediate audio 260B can be retrieved from the content store 275 and passed to the decision engine 300 for encoding.

Decision Engine for Encoding and Distributing Content

Figure 3:
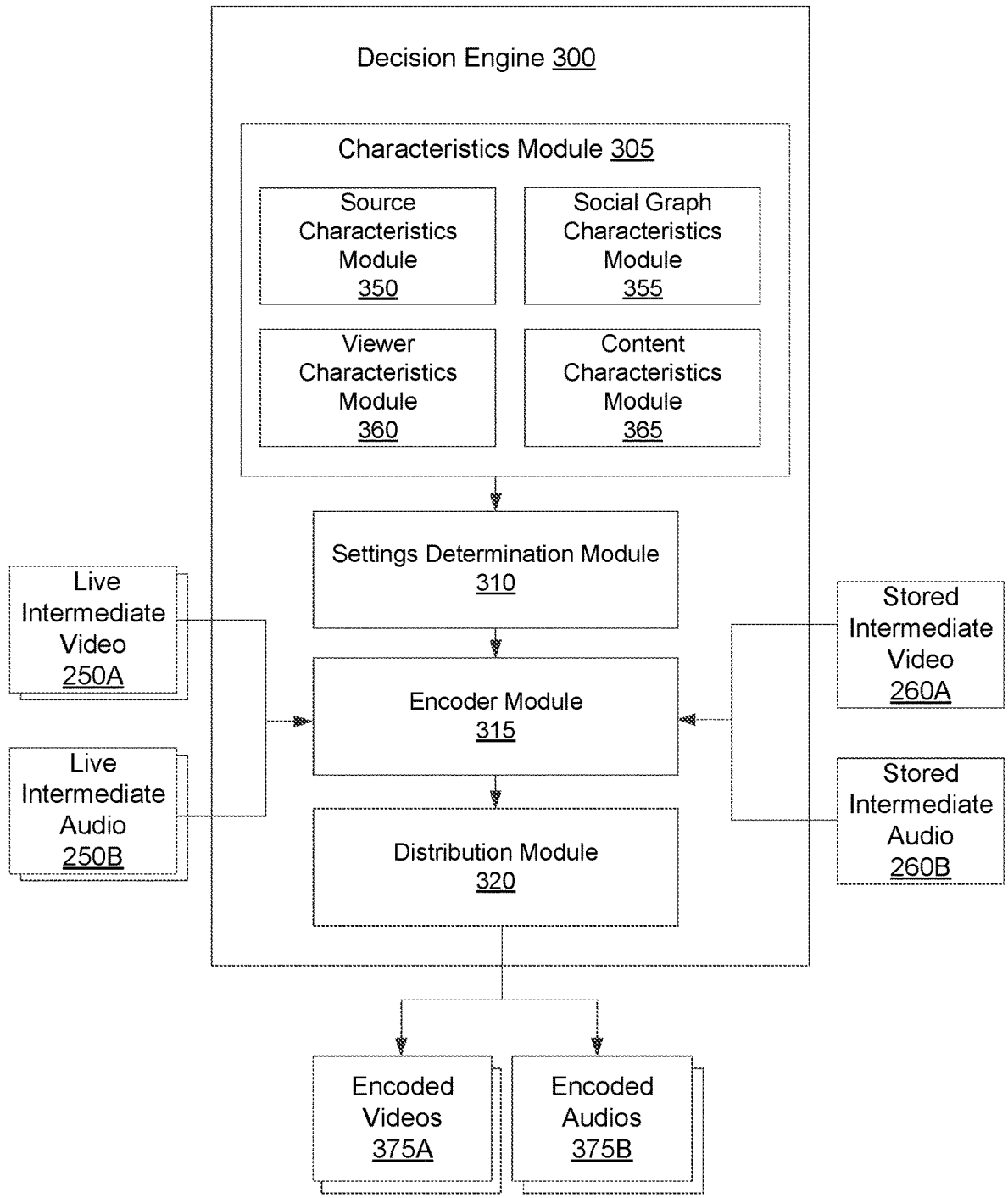
FIG. 3 illustrates a flow diagram for the decision engine of the online system, in accordance with an embodiment.

Referring to FIG. 3, the decision engine 300 receives the different intermediate videos (e.g. live 250A or stored 260A) and different intermediate audio (e.g. live 250B or stored 260B) and decides the encodings for encoding the intermediate video and intermediate audio. Furthermore, the decision engine 300 encodes and distributes the encoded video 375A and encoded audio 375B to client devices 110. In various embodiments, the decision engine 300 includes a characteristics module 305, a settings determination module 310, an encoder module 315, and a distribution module 320.

This process conducted by the decision engine 300 is beneficial because given that encoding audio and video information is an expensive process, encoding the intermediate videos 250A and 260A and intermediate audio 250B and 260B to generate a set of optimal content encodings, as opposed to all possible content encodings, can reduce the resources (e.g. processor power, memory, time) required in the encoding process. However, as the decision engine 300 saves resources by generating a smaller number of encodings, the online system 130 risks not having a particular encoded video 375A or encoded audio 375B when it is needed for a client device 110. Therefore, the decision engine 300 continuously evaluates the tradeoff between minimizing the resources consumed by the encoding process and ensuring that all client devices 110 that request the content can receive an appropriately encoded video 375A and/or encoded audio 375B.

Characteristics for Deciding Appropriate Encodings

The characteristics module 305 may retrieve a variety of characteristics associated with the original content (e.g. video 205A and audio 205B) in order to determine the appropriate set of content encodings to be generated for the encoded video 375A and encoded audio 375B. In various embodiments, the characteristics module 305 further includes a source characteristic module 350, a social graph characteristic module 355, a viewer characteristics module 360, and a content characteristics module 365. Each of the modules in the characteristics module 305 is responsible for obtaining characteristics that are then used by the settings determination module 310 to determine the set of optimal encodings to generate the set of encoded videos 375A and encoded audios 375B. In one embodiment, the variety of characteristics associated with the original content (e.g. video 205A and audio 205B) are represented by a set of rules for determining the optimal set of encodings, and the decision engine 300 is configured to dynamically determining the optimal set of encodings based on the set of rules.

The source characteristics module 350 receives characteristics that are associated with the content provider device 105 that originally provided the content including video 205A and audio 205B data. In one embodiment, the source characteristics can include an intrinsic characteristic of the content provider device 105. For example, an intrinsic characteristic may include the camera resolution of the content provider device 105 that would limit the video resolution of the content that can be generated by the content provider device 105. If the video 205A content is captured by the content provider device 105 with a low resolution (e.g. 480p), then the intermediate video should not be encoded with an encoder configured for 1080p or 4k resolution video. In order to obtain the intrinsic characteristics of content provider device 105, the source characteristics module 350 may obtain device identifiers that identify the device of the content provider device 105. Thus, the characteristics module 305 can identify each content provider device's 105 hardware specifications (e.g. camera megapixels), operating system, and other information that may be informative in deciding the appropriate set of content encodings.

In another embodiment, the source characteristic may also include a user-selected setting associated with the video 205A or audio 205B information of the content. For example, the user-selected setting may indicate that a video is to be generated using a 720p video resolution even though the intrinsic characteristic of the camera enables capture of 1080p video resolution. Therefore, the optimal encoders would not include the encoders configured for 1080p video resolution.

In other embodiments, the source characteristics include historical data associated with the content provider device 105. For example, the content provider device 105 may be a highly popular live broadcast host that, in the past, has often provided live streaming content to the online system 130 to be transmitted to client devices 110. Therefore, a user of the content provider device 105 may have many subscribers that would likely be interested in tuning in when the content provider device 105 is providing new, live-streaming content. More generally, if a wide variety of client devices 110 traditionally access the content (e.g. live or non-live content) provided by the content provider device 105, then the content would need a wide set of content encodings to account for the wide variety of client devices 110 that need to access the content.

In some embodiments, the source characteristics module 350 further utilizes the historical data to rank the content provider device 105 based on its popularity. For example, a content provider device 105 may be compared to others and ranked based on how many users typically view content provided by the content provider device 105. Thus, the content provider device 105 can be categorized in the top 1%, 5%, 10%, etc. of all content provider devices 105. Therefore, the set of content optimal encodings for encoding the intermediate video 250A or 260A and intermediate audio 250B and 260B may be selected based on the ranking of the content provider device 105 that originally provided the content. For example, if the content provider device 105 is ranked in the top 1% in terms of popularity, then the optimal set of content encodings can be selected to include all possible content encodings to ensure that all client devices 110 that request to access the content can receive appropriately encoded video 375A and encoded audio 375B.

The social graph characteristics module 355 receives characteristics associated with the online user profile of the individual using the content provider device 105. More specifically, the characteristics include social graph information. For example, a user of the content provider device 105 may first login to the online system 130 before transmitting the content that is to be sent to client devices 110. Thus, in doing so, the social graph characteristics module 335 can readily identify the user of the online system 130 that is providing the content based on an online system user identifier (e.g. login user ID) associated with the user. The social graph characteristics module 335 retrieves social graph characteristics of the user which includes social graph information such as the number of friends (e.g. nodes) that are connected to the user through the social graph as well as the number of likes or comments (e.g. edges) that the user's friends have provided on content that the user has previously provided. Social graph characteristics obtained by the social graph characteristics module 355 provides an indication as to the user's popularity on the online system 130. Therefore, the online system 130 will select a set of content optimal encodings taking into consideration the user's popularity on the online system 130.

The viewer characteristics module 360 receives characteristics of the one or more client devices 110 that request to access the content. For example, when a client device 110 sends a request to access live or non-live content, the viewer characteristics module 360 may also receive information that allows for identification of viewer characteristics of the client device 110 that sent the request. For example, a viewer characteristic may be an intrinsic characteristic (e.g. screen resolution, operating system) of the client device 110 that is used to determine which encodings are unnecessary. If the client device 110 is a mobile device or a poor screen resolution, then content with high video resolution encodings (e.g. 4k video resolution) can be readily eliminated from the optimal set of content encodings. As another example, the viewer characteristic may include the geographical location of the client device 110. For example, if the vast majority of client devices 110 that request to access content originate from a location that does not have the wireless infrastructure to transmit high quality content (e.g. 4k video resolution, high audio bitrate), then the optimal set of content encodings can be selected accordingly.

The content characteristics module 365 receives characteristics describing the content. For example, a content characteristic can be the duration of the content. With a fixed amount of resources, the online system 130 can encode a larger number of content that are short in duration in comparison to content that are longer in duration. Therefore, content below a certain length may be encoded to generate a wider set of content encodings given the lower expense. Another content characteristic can include an identification of the subject matter of the content. In one embodiment, the content characteristics module 365 can employ a machine learning model that identifies the subject matter. This is helpful for deciding an optimal set of content encodings because highly popular subject matter (e.g. a National Football League (NFL) sporting event) would likely cater to a wide number of viewers with various client devices 110.

Selecting the Appropriate Encoders

The settings determination module 310 receives the characteristics (e.g. source characteristics, social graph characteristics, viewer characteristics, and content characteristics) received by the characteristics module 305 and identifies the optimal set of content encodings for encoding uncompressed/decoded media stream content. In order to do so, the settings determination module 310 may apply a variety of techniques which are described hereafter.

In one embodiment, the settings determination module 310 employs a filtering process to filter out encodings that would be unnecessary based on the various characteristics received from the characteristics module 305. For example, the settings determination module 310 filters out all encodings that would be incompatible with the source characteristics associated with the content provider device 105. If the content that originates from the content provider device 105 has a 1080p resolution, the settings determination module 310 eliminates all encoding options that are of higher video resolution (e.g. 5k, 8k resolution). Additionally, the settings determination module 310 also filters out encodings that would be incompatible with the viewer characteristics of the client devices 110. If the client devices 110 that are requesting to access the stream are mobile devices with a maximum display resolution of 1080p, the settings determination module 310 eliminates encoding options of higher video resolutions (e.g. 4k, 5k, 8k resolution).

As another example, the settings determination module 310 filters out encodings based on the source characteristics that include historical data of the content provider device 105. For example, if the content provider device 105 has previously provided content in the past, the settings determination module 310 obtains information regarding the set of content encodings that were previously used to encode the previously provided content. In various embodiments, if the previously encoded content was transmitted to client devices 110 without significant issues (e.g. incompatibility issues, latency/buffering issues), then the settings determination module 310 can generate the same set of content encodings for the current content provided by the same content provider device 105. In other embodiments, if the previously encoded content experienced significant issues when transmitted to client devices, the settings determination module 310 can choose to alter the content encodings from the previously identified set of content encodings.

In various embodiments, the settings determination module 310 maps the characteristics received from the characteristics module 305 to an optimal set of content encodings. For example, the settings determination module 310 receives source characteristics regarding the ranked popularity of the content provider device 105. If the content provider device 105 is above a threshold ranking (e.g. in the top 5% of content providers), the settings determination module 310 maps this information to a pre-determined set of content encodings. In this case, given that the content provider device 105 is highly popular, the set of content encodings may be all possible content encodings to ensure that all encodings of the content are available to be distributed to a wide variety of client devices 110. Alternatively, if the content provider device 105 is below a threshold ranking (e.g. ranking below 50% of content providers in popularity), then the settings determination module 310 can map this information to a set of content encodings that would be a subset of all possible content encodings. For example, if the content provider device 105 ranks in the bottom 10% of content providers, the content encodings included in the subset may correspond to content encodings that can be readily handled by any client device 110 (e.g. low 360p video resolution, low 16 kbps audio bitrate).

As another example, the settings determination module 310 maps social graph characteristics of the user that uses the content provider device 105 to a set of content encodings. If the user has an extensive social graph on the online system, the settings determination module 310 can select a set of optimal encodings that similarly includes most or all of the possible encodings. More specifically, a user may be classified as having an extensive social graph by having above a threshold number of connected friends or having received above a threshold number of "likes" or "comments" on content that was previously posted by the user on the online system. Conversely, if the user has a minimal social graph (e.g. below a threshold number of friends, below a threshold number of "likes" or "comments"), the settings determination module 310 can readily select a set of content encodings that is a subset of all possible encodings.

In other embodiments, the settings determination module 310 employs a machine learning model to identify the optimal set of content encodings. The settings determination module 310 can train the machine learning model using machine learning techniques and algorithms that include, but are not limited to, neural networks, naïve Bayes, support vector machines and machine learning used in HIVE™ frameworks. The machine learning model receives, as inputs, the various characteristics from the characteristics module 305 and outputs a set of content encodings for the content that is determined based on the input characteristics.

The machine learning model can be trained to assign differing weights to each of the input characteristics. For example, the machine learning model can be trained to more heavily weigh source characteristics in comparison to the content characteristics. Therefore, the intrinsic characteristics of the content provider device 105 that would significantly impact the quality of the content can be considered far more heavily in determining the set of content encodings in comparison to the length or subject matter that describe the content.

The settings determination module 310 can continuously retrain the machine learning model based on feedback that it receives regarding the encoded video 375A and encoded audio 375B. For example, the video and audio component of a content item may have been previously encoded using a wide variety of encoders. However, if only a small subset of the encoded videos 375A and encoded audios 375B are distributed to client devices 110, then the settings determination module 310 can retrain the machine learning model. The machine learning model can be trained to adjust the weights on the characteristics in order to remove encodings that correspond to undistributed encoded videos 375A and encoded audios 375B. Alternatively, if certain encoded videos 375A and encoded audios 375B were distributed to client devices 110, but they suffered from poor performance (e.g. high latency or extensive buffering), the settings determination module 310 can retrain the machine learning model to more heavily weigh the viewer characteristics (e.g. geographic location of the client device 110) such that if a vast majority of client devices 110 that want to access the content derive from certain geographic locations that have limited bandwidth capacity, then the settings determination module 310 can remove encodings that would require significant bandwidth to effectively transfer the encoded content.

Encoding and Distributing the Content

Once the setting determination module 310 decides on the set of content encodings, the encoder module 315 receives the content (e.g. stored intermediate video 260A and stored intermediate audio 260B) and encodes the video and audio to generate encoded videos 375A and encoded audios 375B. The encoder module 315 may further associate metadata information with each encoded video 375A and encoded audio 375B, the metadata information describing the encoding that was used such that the client devices 110 can readily decode the encoded video 375A and encoded audio 375B accordingly for playback.

If the content is a live stream, the encoder module 315 continuously receives more than one live intermediate video 250A and more than one live intermediate audio 250B from the content processing module 200 as the live stream is ongoing. Thus, the encoder module 315 encodes each live intermediate video 250A segment and each live intermediate audio 250B segment using the appropriate encoders to generate the optimal set of content encodings. In various embodiments, the encoder module 315 finishes encoding portions of the live intermediate video 250A and intermediate audio 250B as they are generated and caches the encoded portions to ensure that they can rapidly be delivered to a client device 110 upon request. For example, the encoded portions of the content may undergo HTTP caching and distributed in a content distribution network (CDN).

Alternatively, if the content is non-live content, the encoder module 315 may receive a single stored intermediate video 260A and a single stored intermediate audio 260B from the content processing module 200. Thus, the encoder module 315 may retrieve the optimal encoders and encodes the stored intermediate video 260A and stored intermediate audio 260B.

The distribution module 320 is responsible for delivering the appropriately encoded video 375A and encoded audio 375B to the client device 110 such that the client device 110 can appropriately decode and playback the encoded video 375A and encoded audio 375B. For example, the distribution module 320 may also receive the viewer characteristics (e.g. screen resolution) of the client device 110 previously received by the viewer characteristics module 360. Thus, if the client device 110 has a 1080p resolution touchscreen, then the distribution module 320 may choose to distribute an encoded video 375A that was encoded for 1080p playback.

If the content is live content, the distribution module 320 sends the encoded video 375A and encoded audio 375B as small data packets with pre-determined file sizes. For example, data packets of the encoded video 375A and encoded audio 375B may each have a file size ranging from 500 kilobyte to 1 megabyte. The distribution module 320 transmits the encoded video 375A and encoded audio 375B according to standard protocols such as RTMP over TCP. In other scenarios, the distribution module 320 can employ RTP over UDP procedures.

In various embodiments, the distribution module 320 may monitor the performance of the encoded video 375A and encoded audio 375B after they are distributed to the client device 110. The distribution module 320 can provide the performance as feedback to the settings determination module 310 of the decision engine 300. For example, the optimal set of content encodings for an intermediate video (250A or 260A) and intermediate audio (250B or 260B) may have been previously identified by the settings determination module 310 to be a subset of all possible content encodings. However, the distribution module 320 may distribute the encoded video 375A and encoded audio 375B and realize that the content is rapidly increasing in popularity (e.g. going viral). Thus, the distribution module 320 may inform the settings determination module 310 of the positive performance. The settings determination module 310 can choose to reevaluate and broaden the set of encodings to ensure that the client devices 110 that are partaking in the virility of the content can appropriately access the encoded video 375A and encoded audio 375B.

Process for Encoding and Distributing Content

Figure 4:
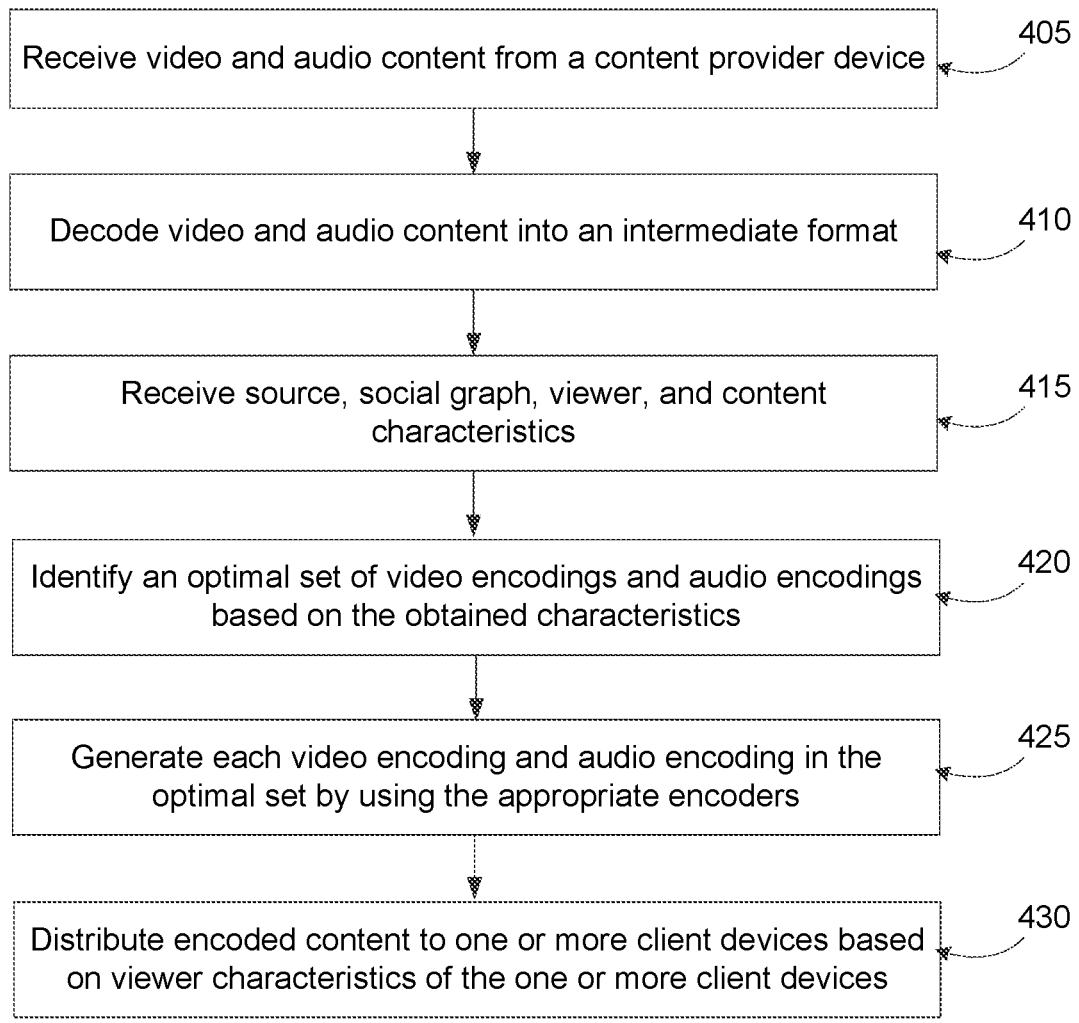
FIG. 4 illustrates a flow chart of encoding and distributing, by the decision engine, the content to client devices, in accordance with an embodiment.

FIG. 4 illustrates a flow process for identifying an optimal set of content encodings for video and audio content and distributing the content to one or more client devices for playback, in accordance with an embodiment.

The online system 130 receives 405 video and audio content from a content provider device 105. The content provider device 105 may be a laptop or mobile device that belongs to an individual that is a registered user of the online system 130. In various embodiments, the content may be live content such as a live stream. In other embodiments, the content may be non-live content. The online system 130 decodes 410 the video and audio content into intermediate video and intermediate audio content.

The online system 130 receives 415 a variety of different characteristics including source characteristics, social graph characteristics, viewer characteristics, and content characteristics. Based on the characteristics, the online system 130 identifies 420 an optimal set of content encodings for encoding the video and audio content. To obtain the optimal set of content encodings, the online system 130 can use a variety of techniques such as filtering out inappropriate encodings that are incompatible with the received characteristics, mapping the received characteristics to a set of content encodings, or applying the characteristics to a trained machine learning model.

Thus, the online system 130 encodes 425 the video content and audio content using encoders that correspond to the identified optimal set of content encodings. The online system 130 distributes 430 the encoded video 375A and encoded audio 375B to a client device 110 based on viewer characteristics of the client device 110. For example, if a client device is operating on a particular platform (e.g. iOS™ or Android™), the online system 130 transmits an encoded video 375A and encoded audio 375B that can be appropriately played back using the particular platform.

Software Module of Client Device

Figure 5:
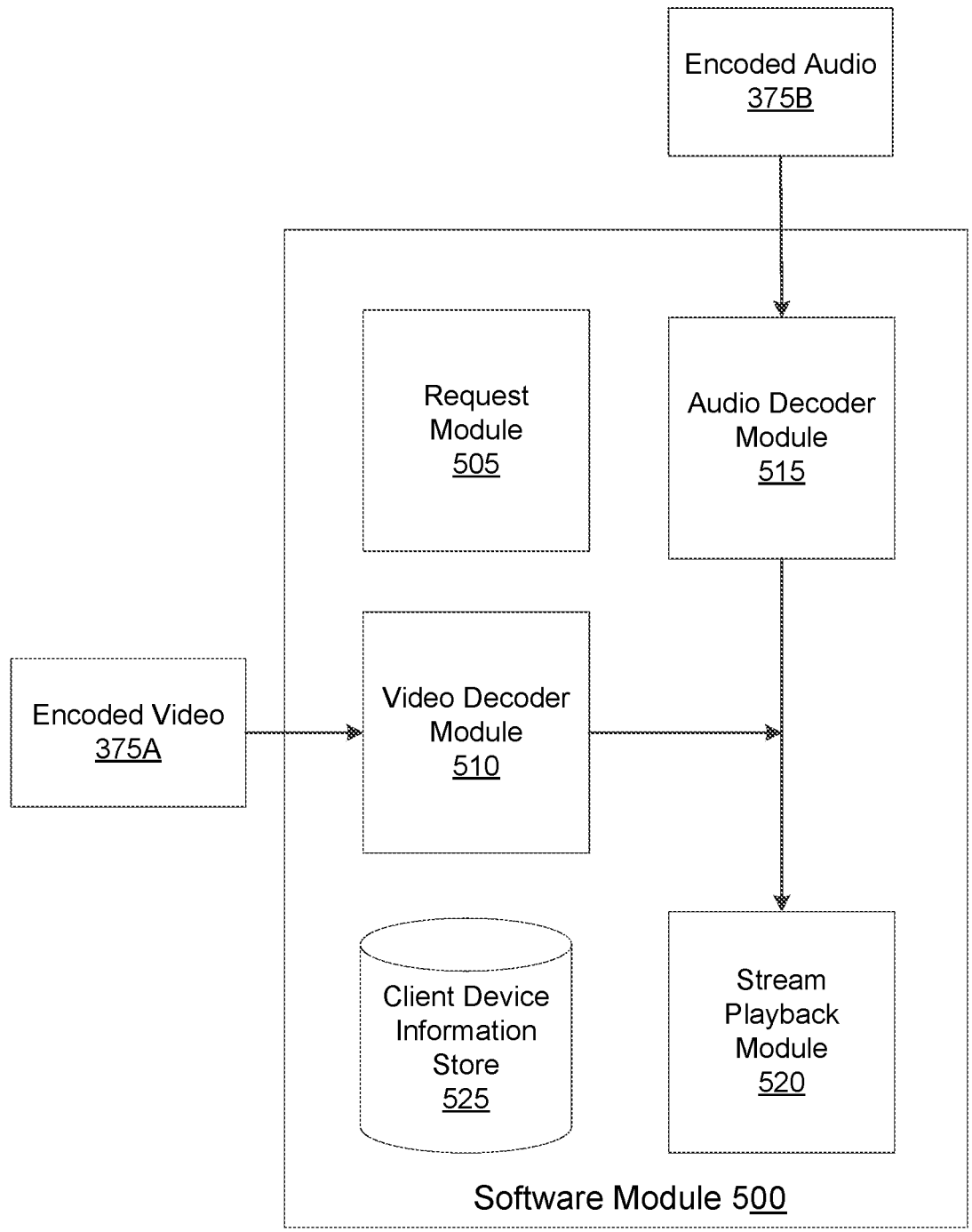
FIG. 5 shows a software module on the client device, in accordance with an embodiment.

FIG. 5 shows a software module 500 on the client device 110, in accordance with an embodiment. The software module 500 is configured to receive and playback the received encoded video 375A and encoded audio 375B. In various embodiments, the software module 500 includes a request module 505, a video decoder module 510, an audio decoder module 515, and a stream playback module 520.

The request module 505 sends a request to the online system 130 in order to access content (e.g. live or non-live content). In various embodiments, the request is sent in response to a received user input. For example, a user of the client device 110 may provide a selection or an indication (e.g. a touch or click) on the user interface 112 that specifies that the user would like to access the content. This user input causes the request module 505 to send the request to the online system 130.

In various embodiments, the request module 505 sends additional information associated with the request to the online system 130. For example, the request module 505 can retrieve information (e.g. viewer characteristics) regarding the client device 110 from the client device information store 525. The viewer characteristics may include a device identifier that identifies the client device 110 or information regarding the hardware specifications (e.g. screen resolution, operating platform) of the client device 110. As previously described, this additional information send in association with the request can help the decision engine 300 of the online system 130 in deciding the set of content encodings that are needed for the content. In other embodiments, the additional information retrieved from the client device information store 525 may be sent to the online system 130 at a different time and need not be sent concurrently with the request for the content. For example, the viewer characteristics associated with the client device 110 can be sent to the online system 130 when the client device 110 first accesses the online system 130 (e.g. when the user first logs in to access the online system 130).

In various embodiments, following the request sent by the request module 505, the software module 500 receives, from the online system 130, the encoded video 375A and encoded audio. The encoded video 375A is processed by the video decoder module 510 whereas the encoded audio 375B is processed by the audio decoder module 515. Each of the encoded video 375A and encoded audio 375B possesses associated metadata information that enables the video decoder module 510 and audio decoder module 515 to appropriately decode the encoded video 375A and encoded audio 375B, respectively.

The stream playback module 520 receives the decoded video and decoded audio and displays the content on a user interface 112 of the client device 110 for consumption by the user of the client device 110. In various embodiments, the stream playback module 520 further monitors the performance of the content as it is displayed. For example, if the content is suffering from latency and/or buffering issues, the playback module 520 may instruct the request module 505 to send the poor performance information to the online system 130. Thus, the decision engine 300 of the online system 130 can readily alter the set of content encodings needed for the content or distribute a differently encoded content (e.g. lower video resolution) to the client device 110 in order for more effective playback.

General

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, at an online system, media content from a content provider device;
   obtaining, by the online system, a plurality of characteristics associated with the media content, the characteristics comprising:
      source characteristics associated with the content provider device, the source characteristics including historical data that indicates content encodings previously used to encode content from the content provider device and a popularity ranking of the content provider device in comparison to a plurality of other content provider devices;
      viewer characteristics associated with each of one or more client devices that have requested to access the received content; and
      social graph characteristics associated with a user of the content provider device that provide an indication of the user's popularity within the online system;
   identifying, by the online system, a set of optimal content encodings for encoding the media content received from the content provider device, the identifying based on the obtained plurality of characteristics, including the historical data, each content encoding in the set having a plurality of encoding parameters for encoding the content, wherein identifying the set of optimal content encodings comprises identifying a wider set of optimal content encodings when the popularity ranking of the content provider device is above a threshold ranking in comparison to when the popularity ranking of the content provider device is below the threshold ranking; and
   distributing at least one encoded media content according to a content encoding in the identified set of optimal content encodings to one or more client devices.

2. The method of claim 1, wherein the source characteristics associated with the content provider device further include at least one of intrinsic characteristics of the content provider device or a user-selected setting of the received content.

3. The method of claim 1, wherein the viewer characteristics associated with each of one or more client devices that have requested to access the received content include at least one of intrinsic characteristics or geographical location information of each of the one or more client devices.

4. The method of claim 1, wherein the indication of the user's popularity comprises a number of contacts of the user within the online system, a contact being another user for which the online system has a stored edge connecting a node representing the user and a node representing the contact.

5. The method of claim 1, wherein the plurality of characteristics further comprises:
   content characteristics associated with the received content, wherein the content characteristics include at least one of a duration of the content and an identification of a subject matter in the content.

6. The method of claim 1, wherein identifying, by the online system, the set of optimal content encodings comprises:
   filtering out content encodings that are incompatible with the source characteristics, the viewer characteristics, or the social graph characteristics.

7. The method of claim 1, wherein identifying, by the online system, the set of optimal content encodings for the content comprises:
   mapping the source characteristics, the viewer characteristics, and the social graph characteristics to the set of optimal content encodings.

8. The method of claim 1, wherein identifying, by the online system, the set of optimal content encodings comprises:
   applying the source characteristics, the viewer characteristics, and the social graph characteristics to a trained machine learning model.

9. The method of claim 1, wherein the content is one of live content and non-live content, and the content comprises video content and audio content.

10. A non-transitory computer-readable medium comprising computer program instructions, the computer program instructions when executed by one or more processors of an online system causing the online system to perform steps including:
   receiving, at the online system, media content from a content provider device;
   obtaining, by the online system, a plurality of characteristics associated with the media content, the characteristics comprising:
      source characteristics associated with the content provider device, the source characteristics including historical data that indicates content encodings previously used to encode content from the content provider device and a popularity ranking of the content provider device in comparison to a plurality of other content provider devices;

viewer characteristics associated with each of one or more client devices that have requested to access the received content; and social graph characteristics associated with a user of the content provider device that provide an indication of the user's popularity within the online system;

identifying, by the online system, a set of optimal content encodings for encoding the media content received from the content provider device, the identifying based on the obtained plurality of characteristics, including the historical data, each content encoding in the set having a plurality of encoding parameters for encoding the content, wherein identifying the set of optimal content encodings comprises identifying a wider set of optimal content encodings when the popularity ranking of the content provider device is above a threshold ranking in comparison to when the popularity ranking of the content provider device is below the threshold ranking; and distributing at least one encoded media content according to a content encoding in the identified set of optimal content encodings to one or more client devices.

11. The non-transitory computer-readable medium of claim 10, wherein the source characteristics associated with the content provider device further include at least one of intrinsic characteristics of the content provider device or a user-selected setting of the received content.

12. The non-transitory computer-readable medium of claim 10, wherein the viewer characteristics associated with each of one or more client devices that have requested to access the received content include at least one of intrinsic characteristics or geographical location information of each of the one or more client devices.

13. The non-transitory computer-readable medium of claim 10, wherein the indication of the user's popularity comprises a number of contacts of the user within the online system.

14. The non-transitory computer-readable medium of claim 10, wherein the plurality of characteristics comprises:

content characteristics associated with the received content, wherein the content characteristics include at least one of a duration of the content and an identification of a subject matter in the content.

15. The non-transitory computer-readable medium of claim 10, wherein identifying, by the online system, the set of optimal content encodings comprises:

filtering out content encodings that are incompatible with the source characteristics, the viewer characteristics, or the social graph characteristics.

16. The non-transitory computer-readable medium of claim 10, wherein identifying, by the online system, the set of optimal content encodings comprises:

applying the source characteristics, the viewer characteristics, and the social graph characteristics to a trained machine learning model.

* * * * *